United States Patent [19]

Morrien

[11] 3,919,652

[45] Nov. 11, 1975

[54] SPLIT-PHASE SIGNAL DETECTOR

[75] Inventor: Albertus Marinus Morrien, Hilversum, Netherlands

[73] Assignee: U.S. Philips Corporation, New York, N.Y.

[22] Filed: Nov. 27, 1973

[21] Appl. No.: 419,4[illegible]

[30] Foreign Application Priority Data

Dec. 14, 1972 Netherlands ....................... 7216972

[52] U.S. Cl. .................... 329/104; 178/67; 325/322
[51] Int. Cl.$^2$ ............................................ H04K 9/04
[58] Field of Search ............ 360/42; 178/68, 67, 88; 325/322, 43; 328/108, 109, 119; 329/104

[56] References Cited

UNITED STATES PATENTS

| | | | |
|---|---|---|---|
| 3,553,597 | 1/1971 | Bugay | 328/109 |
| 3,586,989 | 6/1971 | Wheable | 330/51 |
| 3,631,424 | 12/1971 | Regitz | 360/42 |
| 3,716,780 | 2/1973 | Van Elk et al. | 329/104 |
| 3,795,765 | 3/1974 | DeGroat et al. | 178/68 |

*Primary Examiner*—George H. Libman
*Attorney, Agent, or Firm*—Frank R. Trifari; Henry I. Steckler

[57] ABSTRACT

A split-phase signal detector comprising a signal input terminal which is connected to an input of an amplifier via a capacitor in order to supply a split-phase Manchester-coded binary signal thereto, a controlled contact which is connected between the input and the output of the amplifier for short-circuiting the amplifier each half bit time by way of a clock signal which is synchronous with the split-phase signal, and a bistable element which is connected to the amplifier for setting or resetting the bistable element once per bit under the control of the clock signal by way of the output signal of the amplifier.

1 Claim, 3 Drawing Figures

SPLIT-PHASE SIGNAL DETECTOR

The invention relates to a split-phase signal detector, comprising a signal input terminal for receiving a split-phase Manchester-coded binary signal to be detected, a clock pulse input terminal for receiving a clock pulse signal which has the same frequency as the split-phase signal and which is synchronous with the split-phase signal to be detected, an amplifier which is coupled to this signal input terminal, a contact being connected to an input of said amplifier, the said contact being provided with a control input which is connected to the clock pulse input terminal for switching the amplifier per clock pulse such that the amplifier supplies an output signal which is dependent of the sign of the difference of two successive signal values occurring in each bit of the split-phase signal, and a bistable element which is connected to the amplifier and which is provided with a trigger input connected to the clock pulse input terminal for setting or resetting, per clock pulse, the bistable element in accordance with the output signal supplied by the amplifier.

A detector of this kind in which the amplifier is a differential amplifier and in which the signal input terminal is connected on the one side to one input of the amplifier via the contact and on the other side directly to the other input of the amplifier, and in which a capacitor is connected between the input of the amplifier connected to the contact and a common conductor (earth), is used in a commercially available receiver. In order to enable correct detection also of weak signals, such split-phase detectors are subject to severe requirements. Inter alia the output voltage of the amplifier must be independent over a large range of the amplitudes of identical signals applied to the two inputs. Furthermore, an amplifier of this kind should have no drift. The known detector can satisfy these requirements to only a limited extent. The invention has for its object to realize a simple split-phase detector which completely satisfies the said requirements.

The detector according to the invention is characterized in that the signal input terminal is connected to the input of the amplifier via a capacitor, the contact being connected between the input and the output of the amplifier.

The invention is inter alia based on recognition of the fact that in the known detector, due to the nature of the split-phase signal to be detected, the amplifier operates from two starting settings, only one of which can be compensated for drift.

It is to be noted that U.S. Pat. No. 3,586,989 describes a switched amplifier which is partly used in the detector according the invention. In contrast with the detector according to the invention, a fixed reference voltage is applied to this known amplifier while the contact is closed.

The invention will be described in detail hereinafter with reference to the figures, parts denoted by the same reference numerals in the figures being identical.

Figure 1:
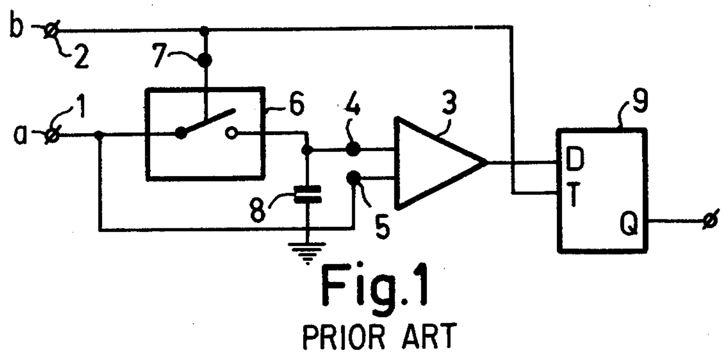
Fig.1 PRIOR ART
FIG. 1 shows a known split-phase detector.
Figure 2:
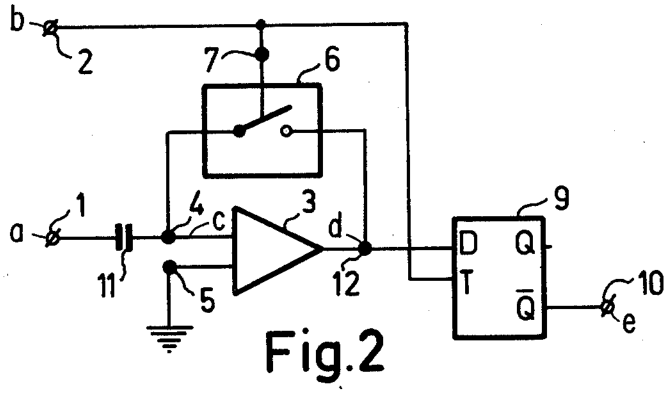
FIG. 2 shows a split-phase detector according to the invention.
Figure 3:
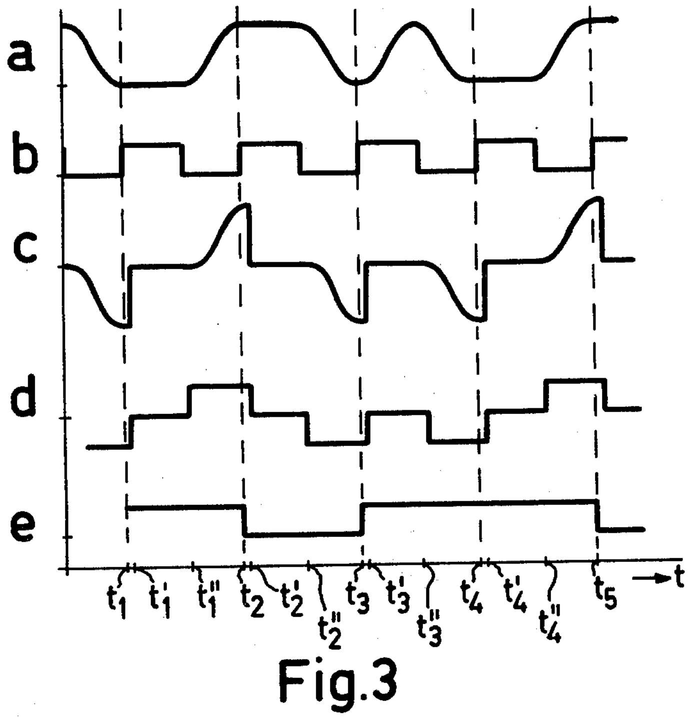

FIGS. 3*a* and 3*b* show signals which are applied to the split-phase detectors shown in the FIGS. 1 and 2.

FIGS. 3*c* and *d*, and *e* show signals which can occur in the split-phase detector shown in FIG. 2. FIG. 1 shows a known split-phase detector which is used inter alia in receivers of personal paging systems. In such systems, each receiver can be called by means of an address which is specifically assigned thereto. The address is then transmitted in the form of a split-phase Manchester-coded binary signal by means of a frequency modulated carrier. A split-phase Manchester-coded signal is to be understood to means a signal which represents a logic 1-signal by a bit signal whose voltage is high during the first half bit time and is low during the other half bit time, and which represents a logic 0-signal by a bit signal whose voltage is low during the first half bit time and is high during the other half bit time, or by signals which are inverse thereto.

On the receiver side, a received signal is mixed to an intermediate frequency, is amplified and is demodulated in known manner. After demodulation, the signal is passed through a filter for the suppression of interference signals. The split-phase signal supplied by the filter is shown in FIG. 3*a*. From this signal a clock signal which is synchronous with this split-phase signal is derived by means of a phase loop, the said clock signal having the same frequency as the split-phase signal and being shown in FIG. 3*b*.

The split-phase signal shown in FIG. 3*a* is applied to the signal input terminal 1, and the clock signal which is shown in FIG. 3*b* is applied to the clock pulse input terminal 2 of the detectors shown in the FIGS. 1 and 2. Furthermore, the detectors shown in these figures are provided with an amplifier 3, one input 4 of which is coupled to the signal input terminal 1, a contact 6 being connected to the input terminal 1, the said contact being provided with a control input 7 which is connected to the clock pulse input terminal 2.

The amplifier of the known detector shown in FIG. 1 is a differential amplifier, the signal input terminal 2 being connected on the one side, via the contact, to the input of the amplifier 3, whilst on the other side it is directly connected to the input 5 of the amplifier 3, a capacitor 8 being connected between input 4 and a common conductor (earth).

The clock signal which is applied to clock pulse input terminal 2 controls the contact 6 such that, if the clock signal is high, i.e., during each first half bit time of the split-phase signal (see FIGS. 3*a* and 3*b*), the contact is closed, and if the clock signal is low, i.e., during each second half bit time of the split-phase signal (see FIGS. 3*a* and 3*b*), the contact is open. As a result, a signal voltage which occurs on signal input terminal 1 during a first half bit time is applied to the two inputs 4 and 5 of the amplifier 3, the said signal voltage charging the capacitor 8. A signal voltage which occurs on signal input terminal 1 during the second half bit time is only applied to input 5 of the amplifier 3 because contact 6 is open, whilst the signal voltage stored in capacitor 8 is applied to input 4, with the result that the output voltage of the differential amplifier 3 is low or high, in accordance with the values of the signal voltages successively appearing in the bit of the split-phase signal. This output voltage is applied to the input D of a bistable element 9. This bistable element is provided with a trigger input T which is connected to the clock pulse input terminal 2. Under the control of the clock signal, the signal voltages supplied by the amplifier 3 set or reset the bistable element 9 per clock pulse. Per bit time the bistable element 9 then applies a binary signal which does not return to zero (a so-termed NRZ-signal) to the signal output Q. As already stated, the differential amplifier 3 is set to a high or to a low signal voltage in this detector during the first half bit time. As a result, the amplifier must have an infinitely large suppression over a large input voltage range for identical signals supplied to the two inputs 4 and 5. However, in practice the amplifier 3 has an offset voltage which makes detection of weak split-phase signals to be detected impossible. The same applies to the drift occurring in the amplifier 3.

In order to eliminate these drawbacks, according to the invention, as is shown in FIG. 2, the signal input terminal 1 is connected, via a capacitor 11, to the input 4 of the amplifier 3, the contact 6 being connected between the input and the output 12 of the amplifier 3, the input 5 of the amplifier 3 being connected to earth.

The operation of the detector will be described in detail with reference to the signals shown in the FIGS. 3*a* 3*e*. The signal supplied by the post-modulation filter is shown in FIG. 3*a* and is applied to signal input terminal 1; this signal is composed of the bits situated between the instants $t_1$, $t_2$, $t_3$, $t_4$, . . . , each of which is represented by a signal having a high and a low signal value.

Under the control of the clock signal shown in FIG. 3*b*, applied to clock pulse input terminal 1, the detector determines per bit the sequence in which these signal values occur, and signal volages corresponding to each of the two possible sequences are supplied.

The clock signal, having a high signal voltage during each first half bit time and a low signal voltage during each second half bit time, keeps contact 6 closed during each first half bit time. When the contact 6 is in the closed state, output 12 of the amplifier 3 is connected to the input 4. The amplifier is then set to the point of its characteristic at which the output voltage is equal to the input voltage.

This input voltage or output voltage, respectively, of the amplifier 3 is shown in the FIGS. 3*c* and 3*d*, respectively, between the instants $t'_1$, $t''_1$; $t'_2$, $t''_2$; $t'_3$, $t''_3$; $t'_4$, $t''_4$ etc.

The amplifier requires a given period of time for setting. Due to this delay time, the time intervals $t'_1 - t''_1$, $t'_2 - t''_2$ etc. are shifted with respect to the time intervals in which the clock signal is high (FIG. 3*b*). The voltage of input 4 of amplifier 3, consequently, is retained during each first half bit time. Consequently, a signal voltage which is applied to the signal input terminal 1 during the first half bit time will charge the capacitor 11 to the value corresponding to the difference between the signal voltage and the voltage of input 4. It is thus achieved that the amplifier 3 is set to one and the same working point, independent of the value of the signal voltage of the split-phase signal occurring in the first half bit time.

Any drift signal appearing on the output 12 of the amplifier 3 when contact 6 is open will also be applied to input 4 during the closing of contact 6. This drift signal changes the charge of capacitor 11 such that the drift signal is compensated for, with the result that drift no longer occurs after the contact 6 has been opened. In this respect, the input resistance of amplifier 3 must be very high so as to prevent the charge of capacitor 11 from being depleted too quickly after the opening of a contact 6.

It is to be noted that the amplifier is not connected in such a way into the circuit that the problems inherent to differential amplifiers do not occur.

The contact 6 is opened when the clock signal changes from a high to a low voltage. The input 4 of the amplifier 3 can follow the voltage variations occurring on the signal input terminal for the time during which the clock signal is low. These input voltage signals are shown in FIG. 3*c*, a change from the setting level to a high signal voltage taking place between the instants $t''_1$ and $t'_2$, a change from the setting level to a low signal voltage between $t''_2$ and $t'_3$, a change from the setting level to a low signal voltage between the instants $t''_3$ and $t'_4$, etc. The amplification factor of the amplifier 3 is chosen to be very high, with the result that after a small variation of the input voltage the amplifier 3 is already driven to full output. This means that at the instant $t''_1$ the amplifier is driven to full positive output, to full negative output at the instant $t''_2$, to full positive output at the instant $t''_3$ etc. as is shown in FIG. 3*d*.

This output voltage is applied to the input D of bistable element 9, the trigger input T of which receives the clock signal shown in FIG. 3*b*. The bistable element 9 is constructed such that it is set or reset by the signal value applied to input D at the instant of appearance of a positive voltage variation on the trigger input T, with the result that the signal output Q supplies a signal corresponding to the signal applied to input D. The positive edges in the clock signal occurring at the instants $t_1$, $t_2$, $t_3$, etc. successively reset, set, reset, reset, etc. the bistable element 9 by way of the signals applied to the input D at these instants. The signal output 10 of the detector is connected to the inverted signal output $\overline{Q}$ of the bistable element 9. This signal, shown in FIG. 3*e*, is applied to this output 10 by the bistable element 9, the said signal representing the binary signal not returning to zero per bit which is to be detected in the received split-phase signal.

It is to be noted that, if a split-phase signal is used in which the signal values of the bits are the inverse of the stated signal values, the output signal of the detector must be derived from the signal output Q of the bistable element 9.

What is claimed is:

1. A split-phase signal detector, comprising a signal input terminal means for receiving a split-phase Manchester-coded binary signal to be detected, a clock pulse input terminal means for receiving a clock pulse signal which has the same frequency as the split-phase signal and which is synchronous with the split-phase signal to be detected, an amplifier having an input and an output, means for periodically setting said amplifier to a fixed reference level comprising a capacitor and a switch, said switch having a first contact coupled to said input of said amplifier, a second contact coupled to said amplifier output, and a control input means coupled to the clock pulse input terminal for switching the switch per clock pulse to cause the amplifier to supply an output signal which is dependent upon the sign of the difference of two successive signal values occurring in each bit of the split-phase signal, a bistable element having an input coupled to the amplifier output, and a trigger input means coupled to the clock pulse input terminal for setting and resetting per clock pulse the bistable element in accordance with the output signal supplied by the amplifier, said capacitor being coupled between the signal input terminal and the input of the amplifier.

* * * * *